O. J. GROEHN.
METHOD OF FORMING SHEET METAL TANKS.
APPLICATION FILED APR. 20, 1914.
1,160,880.
Patented Nov. 16, 1915
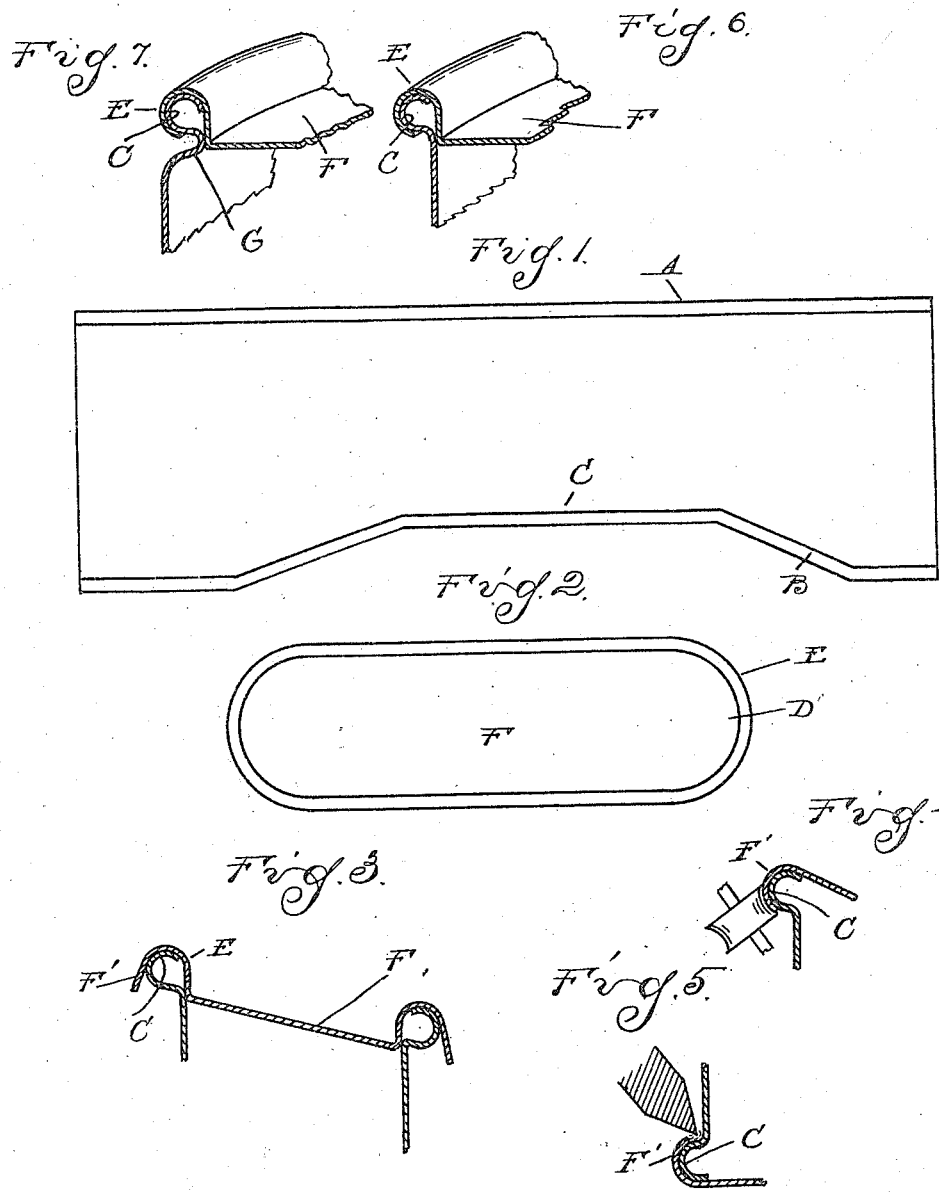
WITNESSES:
James P. Barry
W. K. Ford
INVENTOR
Otto J. Groehn
BY
Whittemore Hulbert & Whittemore
ATTORNEYS

UNITED STATES PATENT OFFICE.

OTTO J. GROEHN, OF DETROIT, MICHIGAN, ASSIGNOR TO BRISCOE MANUFACTURING COMPANY, OF DETROIT, MICHIGAN, A CORPORATION OF MICHIGAN.

METHOD OF FORMING SHEET-METAL TANKS.

1,160,880.  Specification of Letters Patent.  Patented Nov. 16, 1915.

Application filed April 20, 1914. Serial No. 833,265.

*To all whom it may concern:*

Be it known that I, OTTO J. GROEHN, a citizen of the United States of America, residing at Detroit, in the county of Wayne and State of Michigan, have invented certain new and useful Improvements in Methods of Forming Sheet-Metal Tanks, of which the following is a specification, reference being had therein to the accompanying drawings.

The invention relates to a method of forming sheet metal tanks such as those designed for the holding of liquid or gas and it is the object of the invention to simplify the method of construction particularly the sealing of the joint between the body and the heads of the tank.

In the drawings:—Figure 1 is a plan view of a blank for forming the body of the tank, showing the beaded edges thereof; Fig. 2 is a similar view of one of the heads of the tank; Fig. 3 is a cross section showing the manner of first engaging the head with the body; Fig. 4 shows the operation of crimping or securing the head to the body; Fig. 5 illustrates the manner of sealing or soldering the joint; Fig. 6 is a sectional perspective view of the completed joint; and Fig. 7 is a similar view of a modified construction.

In the formation of sheet metal tanks, it is usual to join the heads with the bodies by a lock-seam which is afterward soldered to form a gas or liquid proof seal. The seaming of the parts requires a number of operations, and furthermore places a severe strain upon the metal by the sharp bends required. With my improved method the cost of manufacture may be greatly reduced by dispensing with the usual lock-seam and substituting therefor a crimped bead engagement which is soldered to form the seal. A further saving is effected by forming the beads initially by a die operation and at the same time the blank is fashioned in contour. Thus all of the usual operations required in beading and forming the lock seam are dispensed with, and the blanks as delivered from the press are quickly assembled, interlocked and soldered, forming a stronger construction than that usually obtained.

As shown in Fig. 1, A is a body blank designed for use in connection with an obliquely-inclined head, and therefore fashioned with the inclined portions B at one edge thereof. This blank may be fashioned upon a press by a die operation, and at the same time the marginal edges thereof may be formed with rounded beads C. The heads D are formed in a similar manner and are provided with rounded beads E. The beads C and E are so fashioned as to be capable of telescopically engaging, while the head is formed with a depressed panel F which fits within the body of the tank and overlaps the bead C on the edge of said body. The outer flange F' of the bead E is slightly flaring so as to be easily telescoped with the bead C and is of a size to extend beyond the round of said bead.

When the blanks are formed, the body blank A is bent into the tubular form, having its ends seamed together in the usual way, after which the heads may be engaged therewith, as shown in Fig. 3. When in place the flaring flange F' is subjected to a crimping operation which bends it down, as shown in Fig. 4, extending inward around the bead C so as to lock the head from disengagement. As the joint between the beads is outside of the tank it may be readily soldered, as shown in Fig. 5, so as to form a liquid and gas proof seal.

A joint constructed as described will be stronger than a lock-seam sheet metal joint, as the metal has not been over-strained and any internal pressure in the tank will tend to force the beads together rather than to spring them apart. Where it is desirable that the diameter of the head should not exceed that of the body, a reverse bent bead G may be formed intermediate the bead C and the body portion of the metal, as shown in Fig. 7. This will contribute an additional element of strength without any detrimental stressing of the metal in bending.

What I claim as my invention is:—

The method of forming sheet metal tanks, comprising die fashioning body and head blanks with rounded beaded edges so that the groove of one blank is adapted to receive the rounded end of the bead of the other blank, the latter being provided with a reverse bent bead forming a groove, telescopically engaging said blanks, crimping the edge of the first-mentioned blank into the groove of the other blank, and soldering the adjacent crimped edges to seal the joint.

In testimony whereof I affix my signature in presence of two witnesses.

OTTO J. GROEHN.

Witnesses:
ARTHUR F. ROHRBACH,
HARRY LUMPKIN.